United States Patent
Murase et al.

(10) Patent No.: US 8,288,681 B2
(45) Date of Patent: Oct. 16, 2012

(54) LASER PROCESSING APPARATUS AND LASER PROCESSING METHOD AS WELL AS DEBRIS EXTRACTION MECHANISM AND DEBRIS EXTRACTION METHOD

(75) Inventors: Hidehisa Murase, Kanagawa (JP); Yoshinari Sasaki, Tokyo (JP); Kosei Aso, Kanagawa (JP); Naoki Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1799 days.

(21) Appl. No.: 11/515,896

(22) Filed: Sep. 6, 2006

(65) Prior Publication Data

US 2007/0056941 A1    Mar. 15, 2007

(30) Foreign Application Priority Data

Sep. 8, 2005    (JP) ................ P2005-261248

(51) Int. Cl.
*B23K 26/16* (2006.01)
*H05K 3/08* (2006.01)
*G02F 1/1343* (2006.01)

(52) U.S. Cl. ......... 219/121.69; 219/121.72; 219/121.84; 438/22; 430/270.1; 430/311

(58) Field of Classification Search .......... 349/187–192; 219/121.68, 121.69, 121.84, 121.72; 438/22, 438/26, 28; 156/247; 430/270.1, 311; 136/243, 136/252; 257/431

See application file for complete search history.

(56) References Cited

U.S. PATENT DOCUMENTS

| | | | | |
|---|---|---|---|---|
| 4,732,369 A | * | 3/1988 | Araya et al. ............ | 266/207 |
| 4,892,592 A | * | 1/1990 | Dickson et al. ............ | 136/244 |
| 5,066,357 A | * | 11/1991 | Smyth et al. .................... | 216/18 |
| 5,118,541 A | * | 6/1992 | Yamamoto et al. ........... | 428/64.8 |
| 5,227,606 A | * | 7/1993 | Weeks et al. ............ | 219/121.67 |
| 5,296,674 A | * | 3/1994 | Praschek et al. ......... | 219/121.69 |
| 5,455,998 A | * | 10/1995 | Miyazono et al. .............. | 29/611 |
| 5,592,208 A | * | 1/1997 | Shinozaki et al. ............ | 347/171 |
| 5,922,225 A | * | 7/1999 | Blake ........................ | 219/121.84 |
| 6,060,127 A | * | 5/2000 | Tatah et al. ..................... | 427/458 |
| 6,158,843 A | * | 12/2000 | Murthy et al. .................. | 347/47 |
| 6,159,832 A | * | 12/2000 | Mayer .......................... | 438/584 |
| 6,177,151 B1 | * | 1/2001 | Chrisey et al. ................ | 427/596 |

(Continued)

FOREIGN PATENT DOCUMENTS

JP    58224447 A  * 12/1983

(Continued)

OTHER PUBLICATIONS

Japanese Office Action issued Nov. 30, 2010 for corresponding Japanese Application No. 2005-261248.

*Primary Examiner* — Sammuel M Heinrich
(74) *Attorney, Agent, or Firm* — Rader Fishman & Grauer, PLLC

(57) ABSTRACT

A laser processing apparatus is provided. The laser processing apparatus removes and extracts debris generated by irradiating a transparent resin layer formed on a substrate with laser light during a patterning process, and includes a debris extraction module provided on the upper side of the substrate, wherein the debris extraction module sucks and extracts debris due to sublimation, thermal processing and composite action thereof generated from the transparent resin layer on the substrate irradiated with the laser light from the lower side thereof.

17 Claims, 5 Drawing Sheets

U.S. PATENT DOCUMENTS

| | | | |
|---|---|---|---|
| 6,455,206 B1 * | 9/2002 | Hasegawa et al. | 430/7 |
| 6,586,707 B2 * | 7/2003 | Boyle et al. | 219/121.69 |
| 6,740,474 B2 * | 5/2004 | Border et al. | 430/322 |
| 6,744,010 B1 * | 6/2004 | Pepe et al. | 219/121.71 |
| 6,803,540 B2 * | 10/2004 | Yamada et al. | 219/121.85 |
| 6,805,918 B2 * | 10/2004 | Auyeung et al. | 427/596 |
| 6,919,148 B2 * | 7/2005 | Mitsuhashi et al. | 430/5 |
| 7,014,885 B1 * | 3/2006 | Pique et al. | 427/294 |
| 7,070,906 B2 * | 7/2006 | Wada et al. | 430/273.1 |
| 7,217,334 B2 * | 5/2007 | Toyoda | 156/230 |
| 7,456,238 B2 * | 11/2008 | Koshida et al. | 524/495 |
| 7,483,115 B2 * | 1/2009 | Shigematsu et al. | 349/187 |
| 7,723,029 B2 * | 5/2010 | Huang et al. | 435/6 |
| 7,790,361 B2 * | 9/2010 | Zientek et al. | 430/321 |
| 2002/0029956 A1 * | 3/2002 | Allen | 204/157.15 |
| 2002/0168579 A1 * | 11/2002 | Suzuki et al. | 430/7 |
| 2004/0195576 A1 * | 10/2004 | Watanabe et al. | 257/79 |
| 2007/0039933 A1 * | 2/2007 | Cheng | 219/121.69 |

FOREIGN PATENT DOCUMENTS

| | | | |
|---|---|---|---|
| JP | 61179739 A * | 8/1986 | |
| JP | 06-326337 A | 11/1994 | |
| JP | 09-271980 | 10/1997 | |
| JP | 10137953 A * | 5/1998 | |
| JP | 10137953 A * | 5/1998 | |
| JP | 11197985 A * | 7/1999 | |
| JP | 10-99978 | 10/1999 | |
| JP | 11347755 A * | 12/1999 | |
| JP | 2000-317670 | 11/2000 | |
| JP | 2000-328252 A | 11/2000 | |
| JP | 2001010061 A * | 1/2001 | |
| JP | 2001-053450 A | 2/2001 | |
| JP | 2001-237515 A | 8/2001 | |
| JP | 2002060234 A * | 2/2002 | |
| JP | 2002-126890 | 5/2002 | |
| JP | 2003-181678 A | 7/2003 | |
| JP | 2003-249740 A | 9/2003 | |
| JP | 2004-153171 | 5/2004 | |
| JP | 2004153171 A * | 5/2004 | |
| JP | 2004-188451 | 7/2004 | |
| JP | 2004-226903 A | 8/2004 | |
| JP | 2004-325837 A | 11/2004 | |
| JP | 2005088023 A * | 4/2005 | |
| JP | 2005144530 A * | 6/2005 | |

* cited by examiner

LASER PROCESSING APPARATUS AND LASER PROCESSING METHOD AS WELL AS DEBRIS EXTRACTION MECHANISM AND DEBRIS EXTRACTION METHOD

CROSS REFERENCES TO RELATED APPLICATIONS

The present invention contains subject matter related to Japanese Patent Application JP 2005-261248 filed in the Japanese Patent Office on Sep. 8, 2005, the entire contents of which being incorporated herein by reference.

BACKGROUND OF THE INVENTION

1. Field of the Invention

The present invention relates to a laser processing apparatus and a laser processing method for performing pattern processing on a transparent conductive film used for a transparent electrode on a multilayer thin film of an FPD (Flat Panel Display), a solar cell and the like. Particularly, the present invention relates to a laser processing apparatus and a laser processing method, as well as to a debris extraction mechanism and a debris extraction method for efficiently removing and extracting debris. The debris is particles and products generated during laser processing based on photochemical reaction (ablation), thermofusion or composite action thereof in which a surface of a processing object is irradiated with laser light from the lower side thereof.

2. Description of the Related Art

Resin materials are typically used as a resist material and a planarizing material in a process of manufacturing a flat panel display including a liquid crystal panel. A number of photolithography processes are performed when patterning and etching those resin materials. Hence, a huge facility investment may be required, and a large amount of chemical solution is used, which may cause damage to the environment. In order to solve these problems, there has been desired a technology of directly patterning materials by using laser light. When laser processing is performed in general, extraction of processing products called debris becomes a major issue. Here, the debris is products generated from a processed material that has absorbed and reacted to laser light and minute particles generated from the processed material. These products and particles are suspended and scattered in the air and then re-deposited on a substrate. Particularly, reaction products deposited on the substrate cause a defect in a finished product, because such reaction products are hardened due to the temperature drop when they are re-deposited on the substrate and a removal thereof is difficult even by scrubbing physically using a brush or the like.

In the field of fine processing which deals with the flat panel display including the liquid crystal panel, such re-deposition of particles (dust) definitely causes defects. Accordingly, a technology to extract debris may be required. A transparent conductive film is typically patterned into a desired shape by a photolithography method. For example, a transparent conductive film made of an ITO (Indium Tin Oxides) film, ZnO (Zinc Oxides) film or the like is vacuum-coated on a glass, plastic or silicon-wafer substrate and the like. Then, a resist layer is formed thereon and exposed by irradiation of light through a photomask having a predetermined pattern. The photomask pattern is transcribed onto the resist layer by performing development and post bake, then a portion of the transparent conductive film not covered with the resist is removed by wet etching, and the remaining resist layer is removed at the end so that the desired pattern of the transparent conductive film is obtained.

However, the photolithography process described above may need a large scale apparatus, such as a coater/developer, which causes a problem in view of the facility investment and the footprint. In addition, since a large amount of chemical solution such as a developing solution, is used, there is also caused an environmental preservation problem. Japanese Published Patent Application No. 2004-153171 discloses technology for directly processing a transparent conductive film by using laser light, with which a manufacturing process is simplified by omitting a photolithography process.

Japanese Published Patent Application No. 2004-188451 discloses a laser processing method and a laser processing apparatus, in which a surface of a processing object is irradiated with laser light, causing debris generated from a region irradiated with the laser to be deposited on an adsorption panel by a magnetic field. By doing so, there is obtained a laser processing method in which debris generated by laser processing is prevented from being re-deposited on the processed surface when the processing based on ablation or thermofusion is performed by irradiating the surface of the processing object with the laser light. According to the laser processing methods disclosed in the above-described Patent References, the processing object is irradiated with laser light from the upper side thereof. Therefore, debris from the processing object is scattered in all directions.

Further, Japanese Published Patent Application No. 2002-126890 discloses a debris extraction technology in which a duct for extracting dust, whose shape and distance from the processed surface has been studied, is provided in the case where laser light is used to perform the processing of drilling a metal plate used for an industrial purpose. Further, Japanese Published Patent Application No. 2000-317670 discloses a method of extracting debris by air flow while physically covering an area of an irradiated portion. Furthermore, Japanese Published Patent Application No. 09-271980 discloses a method of sucking debris in which the vicinity of an irradiated portion is made into a double structure using a kind of curtain.

Moreover, Japanese Published Patent Application No. 10-99978 discloses a method of reducing debris deposited onto a substrate. In this method, a fluid delivery apparatus blowing a gas onto a surface in the vicinity of a processed region and a suction duct sucking a fluid on the opposite side are provided. Then, debris is blown off the processed region and simultaneously sucked and removed.

FIG. 1 shows a configuration disclosed in the above-described Japanese Published Patent Application No. 10-99978. An apparatus shown in FIG. 1 is a laser processing apparatus for stamping a manufacturer's serial number on a glass substrate 5 arranged in part of a manufacturing process for preparing a predetermined product. In this manufacturing process, various coating processings and patternings are performed on the glass substrate 5 through a series of processes using a plurality of processing machines. This laser processing apparatus includes a processing table 20, a laser irradiation apparatus 22, a fluid feed apparatus 24, and a discharge apparatus 26. The processing table 20 moves in two directions parallel with a plane of the glass substrate mounted 5 to determine the position of a stamp region 21 where the manufacturer's serial number is stamped. The laser irradiation apparatus 22 stamps the manufacturer's serial number corresponding to the kind of the mounted glass substrate 5 onto the stamp region 21. The fluid feed apparatus 24 has a blow nozzle 23 for directing a fluid to the stamp region 21 of the glass substrate 5 mounted on the processing table 20. The discharge apparatus 26 has a suction duct 28 for sucking the fluid over the stamp region 21. Debris 7 generated by irradiating a black matrix 27 of the stamp region 21 with laser light 1a is removed by a processing using the laser light 1a emitted from a laser oscillator 1 through an objective lens 25 of the laser irradiation apparatus 22.

However, debris is intended to be extracted in those patent references to the extent of not affecting a human body. Hence, it is difficult to control and extract particle patterns in the order of several μm to several tens μm, which can be applied to processing of a fine device such as a transparent conductive film formed on a glass substrate of a liquid crystal panel.

Further, a reaction mechanism called ablation, as described above, may occur in the range of a wavelength of excimer lasers to be used as a laser source, for example. In the ablation processing, energy of the laser light is absorbed by a material to be processed, disintegrating the material without generating heat by disrupting chemical bonds that form a molecular frame. Consequently, it is said that less debris is generated. In addition, a simplified debris extraction method of only blowing a helium (He) gas, a nitrogen ($N_2$) gas or the like is typically used. However, practically, there are not many cases in which the processing of fine devices can be performed only by the ablation of a photochemical reaction, but in most cases a composite process including a heat-affected process is used.

Further, a semiconductor-process-applied product, such as a liquid crystal panel, has a complicated film structure as a material thereof, and therefore a different phenomenon occurs compared with a single-layer film. When a plurality of process factors are thus mixed, the debris extraction becomes complicated, and it is necessary to analyze a debris generation mechanism in detail and to develop a debris extraction method suitable for each case. At present, a transparent conductive film is used as a transparent electrode of a multilayer film substrate for a flat display panel of a solar cell and the like. Also, a transparent conductive film is widely used as a transparent electrode in the field of electronic paper whose development has been promoted as a future display device, and the use thereof has been expanded. Further, since the competition for higher definition and lower costs of a display has become more intensive recently, a transparent conductive film of higher quality and higher productivity may also be required in manufacturing a display. Accordingly, the inventors of the present application recognize a necessity to analyze the debris generation mechanism in detail and to obtain a laser processing apparatus, a laser processing method, a debris extraction mechanism and a debris extraction method which are suitable for each case.

SUMMARY OF THE INVENTION

In the case where a laser processing method using a laser is performed on manufacturing a flat display panel, a solar cell and the like, there is a need for extracting debris efficiently by analyzing a mechanism in which debris is generated with the irradiation of laser light and by using a result of the analysis. Further, a patterning method performed in the photolithography process in the past is replaced with a patterning method using laser light, thereby reducing the investment, the burden on the environment, the manufacturing costs and a footprint.

It is desirable to provide a laser processing apparatus and a laser processing method, a debris extraction mechanism and a debris extraction method, in which a transparent resin layer formed on a substrate is irradiated with laser light from the lower side of the substrate and debris is generated isotropically on the upper side of the substrate when etching and patterning the transparent resin layer.

It is further desirable to provide a laser processing apparatus, a laser processing method, a debris extraction mechanism and a debris extraction method, in which a black resin layer is added between the surface of the substrate and the transparent resin layer. With the black resin layer being provided, the energy of laser light can further be absorbed to vaporize the black resin layer, causing debris generated from a transparent film to be scattered upward by means of an abrupt volume expansion thereof when irradiated with the laser light from the lower side of the substrate.

It is further desirable to provide a laser processing apparatus, a laser processing method, a debris extraction mechanism and a debris extraction method, in which a debris extraction mechanism is provided on the upper side of the substrate and the substrate is irradiated with the laser light from the lower side thereof.

It is further desirable to provide a laser processing apparatus, a laser processing method, a debris extraction mechanism and a debris extraction method, in which a black resin layer easily absorbing laser light is formed on a transparent resin layer, the laser light being focused on the black resin layer, a fine adjustment being performed with respect to the focusing on the surface, and a processed shape of a patterning edge being controlled.

According to an embodiment of the present invention, there is provided a laser processing apparatus removing and extracting debris generated by irradiating a transparent resin layer formed on a substrate with laser light during a patterning process. The laser processing apparatus includes a debris extraction module on the upper side of the substrate. The debris extraction module sucks and extracts debris due to sublimation, thermal processing and composite action thereof generated from the transparent resin layer on the substrate irradiated with the laser light from the lower side of the substrate.

According to another embodiment of the present invention, there is provided a laser processing method of removing and extracting debris generated by irradiating a transparent resin layer formed on a substrate with laser light during a patterning process. The method includes the steps of: providing a debris extraction module on the upper side of the substrate; irradiating the transparent resin layer with the laser light from the lower side of the substrate; and sucking and extracting debris due to sublimation, thermal processing and composite action thereof generated from the transparent resin layer on the substrate by the debris extraction module.

According to a further embodiment of the present invention, there is provided a debris extraction mechanism that removes and extracts debris generated by irradiating a transparent resin layer formed on a substrate with laser light during a patterning process. The debris extraction mechanism includes a debris extraction module provided on the upper side of the substrate. The debris extraction module sucks and extracts the debris due to sublimation, thermal processing and composite action thereof generated from the transparent resin layer on the substrate irradiated with the laser light from the lower side thereof.

According to another embodiment of the present invention, there is provided a debris extraction method removing and extracting debris generated by irradiating a transparent resin layer formed on the substrate with laser light during the patterning process. The debris extraction method includes the steps of: providing a debris extraction module on the upper side of the substrate; irradiating the transparent resin layer with the laser light from the lower side of the substrate; and sucking and extracting debris due to sublimation, thermal processing and composite action thereof generated from the transparent resin layer on the substrate by the debris extraction module.

According to still another embodiment of the present invention, there is provided a laser processing apparatus that removes and extracts debris generated by irradiating a transparent resin layer formed on a multilayer film on a substrate with laser light during the patterning process. The laser processing apparatus includes a thin film absorbing color of a wavelength of the laser light formed on the transparent resin layer on the substrate. The laser light is defocused on the thin film irradiated from the upper side of the substrate, and a pattern edge whose cross section is cone-shaped is formed in the thin film.

According to still another embodiment of the present invention, there is provided a laser processing apparatus including a thin film absorbing color of a wavelength of laser light formed on the transparent resin layer on the substrate. The laser light is defocused on the thin film irradiated from the upper side or lower side of the substrate, and a pattern edge whose cross section is cone-shaped or inverted cone-shaped is formed in the thin film.

According to the above-described embodiments of the laser processing apparatus, the laser processing method, the debris extraction mechanism and the debris extraction method, there is provided the debris extraction module capable of extracting debris generated when patterning a transparent conductive film formed on the multilayer film on the substrate efficiently.

According to the above-described embodiments of the laser processing apparatuses, the resin layer having the predetermined pattern shape is obtained.

DESCRIPTION OF THE PREFERRED EMBODIMENTS

Figure 2:
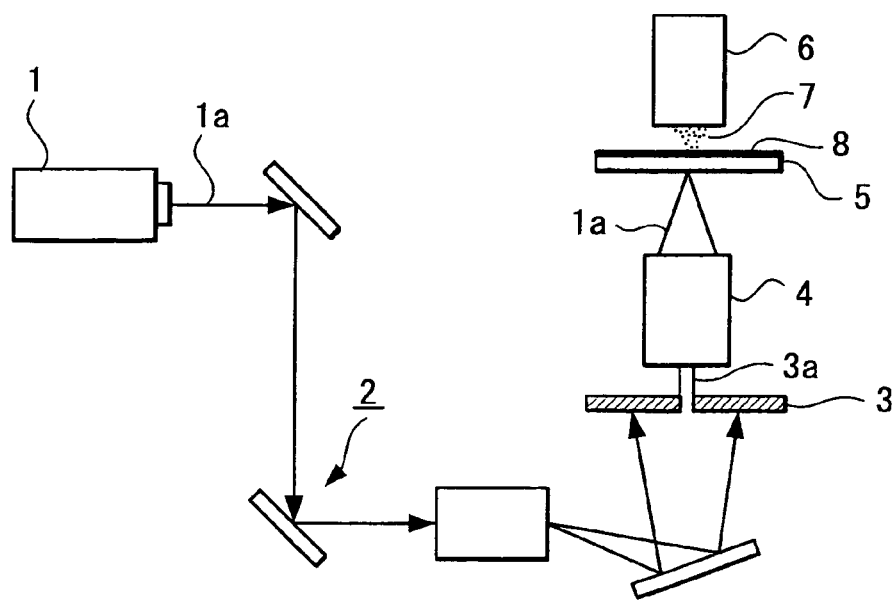
FIG. 2 is an overall constitutional diagram showing a laser processing apparatus according to an embodiment of the present invention.
Figure 5A:
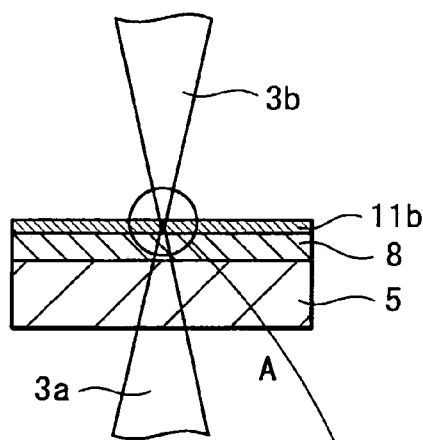
FIGS. 5A to 5C are sectional side views of a substrate in order to explain a method of processing a film formed in the laser processing apparatus according to an embodiment of the present invention.
Figure 5B:
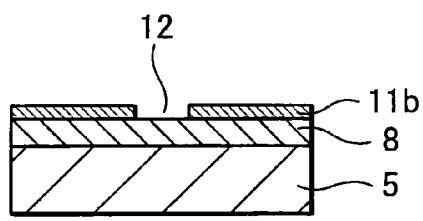
Figure 5C:
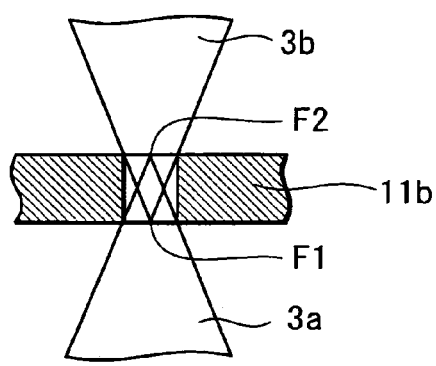
Figure 6A:
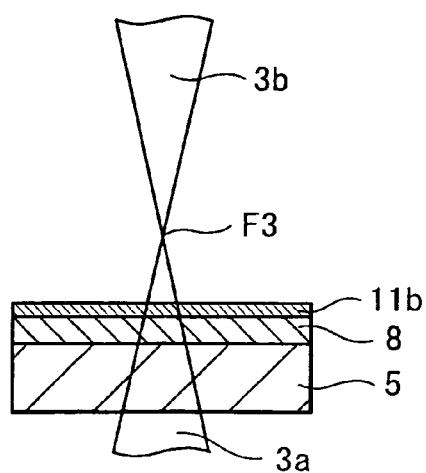
FIGS. 6A and 6B are sectional side views of a substrate in order to explain a method of processing a film formed in the laser processing apparatus according to another embodiment of the present invention.
Figure 6B:
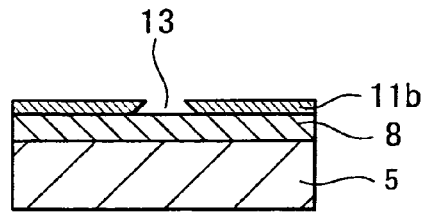
Figure 7A:
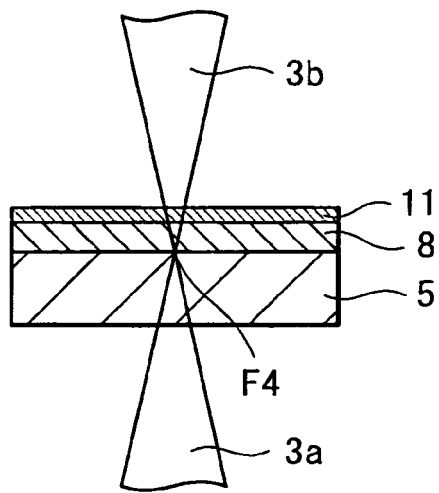
FIGS. 7A and 7B are sectional side views of a substrate in order to explain a method of processing a film formed in the laser processing apparatus according to a further embodiment of the present invention.
Figure 7B:
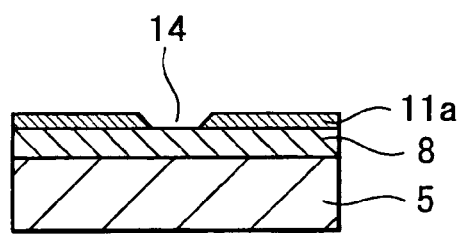

An embodiment of the present invention is explained in the following with reference to FIGS. 2 through 7. FIG. 2 is an overall constitutional diagram showing a laser processing apparatus according to an embodiment of the present invention. FIGS. 3A through 3F are sectional side views of a substrate showing a process of forming a multilayer thin film on the substrate, in order to explain a debris generation mechanism according to an embodiment of the present invention. FIGS. 4A through 4F are sectional side views of a substrate showing a process of forming a multilayer thin film on the substrate, in order to explain a debris generation mechanism according to another embodiment of the present invention. FIGS. 5A to 5C are sectional side views of a substrate in order to explain a method of processing a film formed in the laser processing apparatus according to an embodiment of the present invention. FIGS. 6A and 6B are sectional side views of a substrate, in order to explain a method of processing a film formed in the laser processing apparatus according to another embodiment of the present invention. FIGS. 7A and 7B are sectional side views of a substrate, in order to explain a method of processing a film formed in the laser processing apparatus according to a further embodiment of the present invention.

According to the embodiments of the present invention, there are provided a laser processing apparatus, a laser processing method, and a debris extraction mechanism and a debris extraction method for removing and extracting debris. The debris is particles and products generated during laser processing based on ablation, thermofusion or the combined action thereof. Specifically, when forming a transparent conductive film and a transparent resin layer on a multilayer film formed on a glass substrate that is a processing object, the surface of the transparent resin layer is irradiated with laser light from the lower side of the substrate, generating debris to be extracted.

Hereinafter, an embodiment of a laser processing apparatus according to the present invention is explained with reference to FIG. 2. FIG. 2 schematically shows a laser optical system and a debris extraction mechanism according to the embodiment of the present invention. Laser light 1a shown in FIG. 2 is emitted from a laser oscillator 1 having a laser light source. The laser light 1a passes through a planarizing optical system 2 including a homogenizer and a diffraction grating, for example, and is planarized such that energy from the laser light source becomes uniform. The laser light 1a is shaped into a laser beam 3a of a desired beam size by a variable aperture 3 that determines the size thereof. Then, the laser beam 3a whose size is determined by the variable aperture 3 is reduced and focused by a reduction projection lens 4. Consequently, a transparent resin layer 8 formed on a multilayer film on the surface of a substrate 5 made of, for example, glass is irradiated with the laser beam 3 from the lower side of the substrate 5. A debris extraction mechanism 6 is provided above the substrate 5 so that debris 7 generated from the transparent resin layer 8 is extracted by the debris extraction mechanism 6.

An excimer laser, for example, is used for the laser light source of the laser oscillator 1 shown in FIG. 2. There exist plural kinds of excimer laser each having a different laser medium, and those media are XeF (351 nm), XeCl (308 nm), KrF (248 nm), ArF (193 nm) and $F_2$ (157 nm), in the order of increasing wavelength. However, it should be appreciated that the laser is not limited to an excimer laser but may be a solid-state laser, a $CO_2$ laser or the like. The planarizing optical system 2 shapes the laser light 1a emitted from the laser light source and reflected by a mirror, and outputs the laser light after homogenizing a beam intensity. For example, a perforated mask of a predetermined aperture formed of a metal material, a photomask formed of a transparent glass material or metal thin film, a dielectric mask formed of a dielectric material, and a variable aperture capable of varying an aperture are used for the variable aperture 3.

After passing through the aperture 3, the laser light 1a has a predetermined beam diameter. A laser beam 3a having passed through the aperture 3 is projected with a predetermined reduction magnification through the reduction projection lens 4 onto a processed surface of the transparent resin layer 8 that is a processing object on the substrate 5. The reduction projection lens 4 is disposed such that the laser light projected from the reduction projection lens 4 is focused onto the processed surface of the transparent resin layer 8 formed on the substrate 5. The substrate 5 is arranged on a stage (not shown) in the figure and is capable of being moved and positioned along a horizontal plane perpendicular to an optical axis of the laser beam 3a. Therefore, the processed surface of the transparent resin layer 8 can be scanned by the laser beam 3a emitted from the laser oscillator 1 passing through a through hole provided in the stage.

Figure 3A:
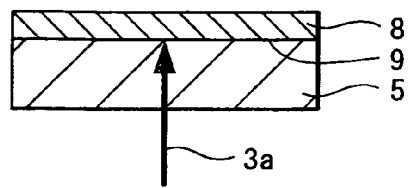
FIGS. 3A through 3F are sectional side views of a substrate showing a process of forming a multilayer thin film on the substrate, in order to explain a debris generation mechanism according to an embodiment of the present invention.
Figure 3B:
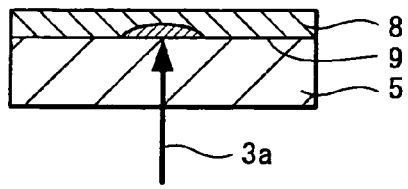
Figure 3C:
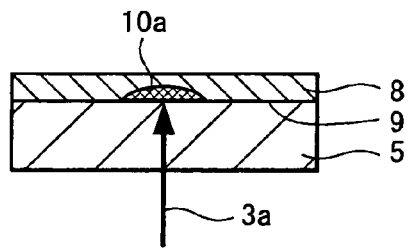

FIGS. 3A through 3F show a debris generation mechanism in the case where the above-described laser processing apparatus is used and the wavelength of the laser light 1a emitted from the laser oscillator 1 is of light a large amount of which is absorbed into the transparent resin layer 8. First, as shown in FIG. 3A, a boundary surface 9 between the substrate 5 made of, for example, glass and the transparent resin layer 8 formed thereon is irradiated with the laser beam 3a emitted from the laser source from the lower side through the transparent substrate 5. Subsequently, as shown in FIG. 3B, fusion due to thermal reaction, sublimation due to ablation reaction and composite action of physical destruction occur, causing the lower surface of the transparent resin layer 8 to be etched. In this regard, since the transparent resin layer 8 is irradiated with the laser beam 3a from the lower side of the substrate 5, the transparent resin layer 8 absorbs energy of the laser beam 3a through the boundary surface 9 between the substrate 5 and the transparent resin layer 8. Accordingly, as shown in FIG. 3C, a thermal etching portion 10a is formed due to heating on the etched portion.

Figure 3D:
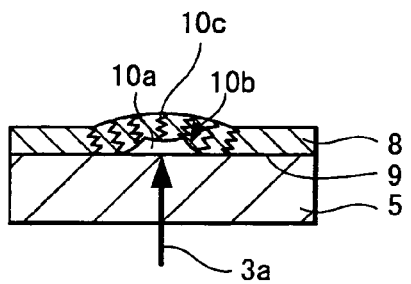

When the energy of the laser beam 3a exceeds a threshold value of vaporization heat in the transparent resin layer 8, the transparent resin layer 8 instantly vaporizes from a solid state. Accordingly, as shown in FIG. 3D, the volume of the thermal etching portion 10a abruptly expands on the boundary surface 9 to form a volume-expanded portion 10b.

Figure 3E:
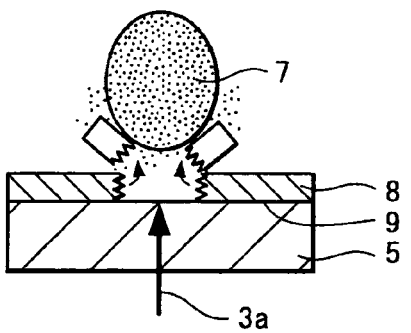
Figure 3F:
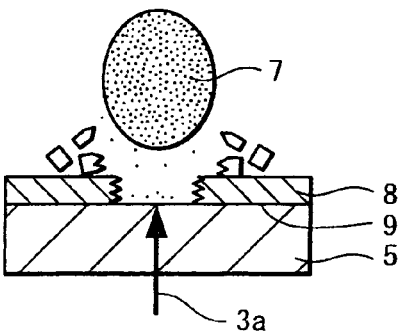

Further, the transparent resin layer 8 is pushed upward to make micro cracks, and eventually, as shown in FIGS. 3E and 3F, the transparent resin layer 8 is isotropically broken upward, causing the broken pieces scattering like an explosion to become debris.

Figure 4A:
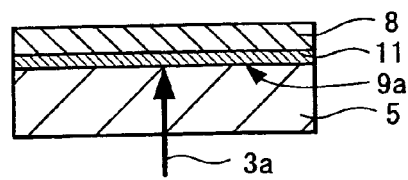
FIGS. 4A through 4F are sectional side views of a substrate showing a process of forming a multilayer thin film on the substrate, in order to explain a debris generation mechanism according to another embodiment of the present invention.

Next, FIGS. 4A through 4F show a case in which the wavelength of the laser light 1a emitted from the laser source of the laser oscillator 1 is of light a small amount of which is absorbed into the transparent resin 8. In this regard, a layer capable of easily absorbing the laser light such as a black resin layer 11, for example, is interposed between the substrate 5 and the transparent resin layer 8. More specifically, as shown in FIG. 4A, the black resin layer 11 is formed on a boundary surface 9a with the glass substrate 5, and the transparent resin layer 8 is formed on the black resin layer 11. Since the laser light 1a of a wavelength in the ultraviolet region is used in this embodiment, a color of the resin layer 11 is black, but the color is not specifically limited to black as long as the resin layer is a color layer that can easily absorb laser light of the wavelength to be used. Therefore, the resin layer is called the black resin layer 11 in this embodiment, and that is an example of color layers each absorbing color corresponding to the wavelength.

Figure 4B:
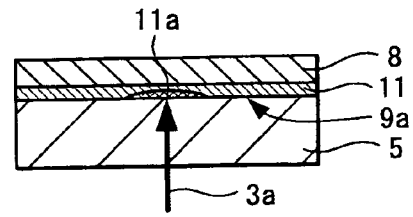

Specifically, FIGS. 4A through 4F show a debris generation mechanism in the case where the laser processing apparatus shown in FIG. 2 is used and the wavelength of the laser light 1a emitted from the laser oscillator 1 is of light of which a small amount of which is absorbed into the transparent resin layer 8 through a color layer absorbing color corresponding to the wavelength. As shown in FIG. 4A, the color layer (here, the black resin layer) 11 that absorbs color corresponding to the wavelength of the laser beam 3a is formed on the substrate 5 made of, for example, glass. The transparent resin layer 8 is formed on this black resin layer 11. When, as shown in FIG. 4B, a boundary surface 9a between the substrate 5 made of, for example, glass and the black resin layer 11 is irradiated from the lower side through the transparent substrate 5 with the laser beam 3a emitted from the laser source, the energy of the laser beam 3a is absorbed into the black resin layer 11 to be heated, causing a heated portion 11a to be formed.

Figure 4C:
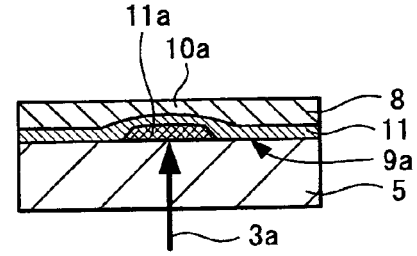
Figure 4D:
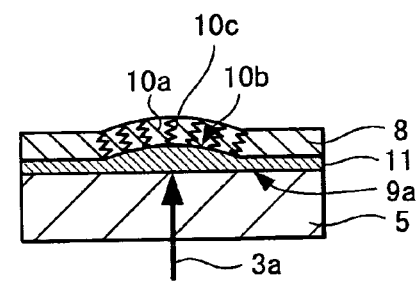
Figure 4E:
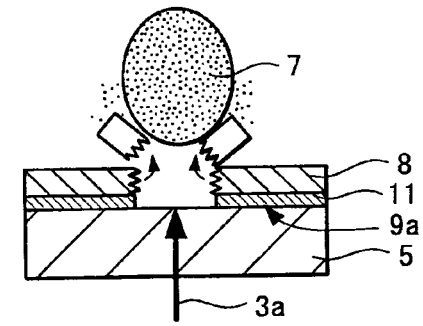
Figure 4F:
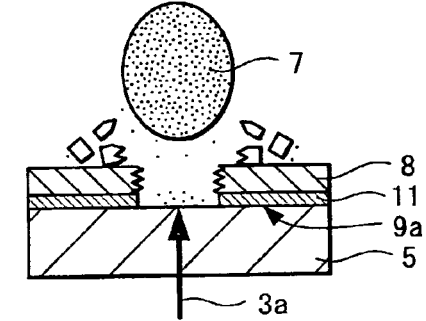

When the energy of the laser beam 3a exceeds a threshold value of the transparent resin layer 8, the thermal etching portion 10a of the transparent resin layer 8 shown in FIG. 4C is heated. Further, the heated portion 11a of the black resin layer 11 that has absorbed the energy vaporizes to cause the abrupt volume-expanded portion 10b. Furthermore, when exceeding the vaporization heat, the heated portion 11a that has absorbed further energy is vaporized instantly from the solid state to cause the abrupt volume expansion. As shown in FIG. 4D, micro cracks 10c are generated in the thermal etching portion 10a of the transparent resin layer 8. Consequently, as shown in FIGS. 4E and 4F, the transparent resin layer 8 is broken isotropically upward, scattering like an explosion to become debris.

Since the debris 7 is scattered isotropically upward when those debris generation mechanisms are used, the debris 7 in the order of several μm to several tens μm patterns can be extracted efficiently during the pattern shaping with the debris extraction mechanism 6 that is provided on the upper side. In addition, generation of the micro cracks and the size of debris can be controlled by selecting a method of absorbing the energy and by adjusting the intensity of the energy.

Figure 1:
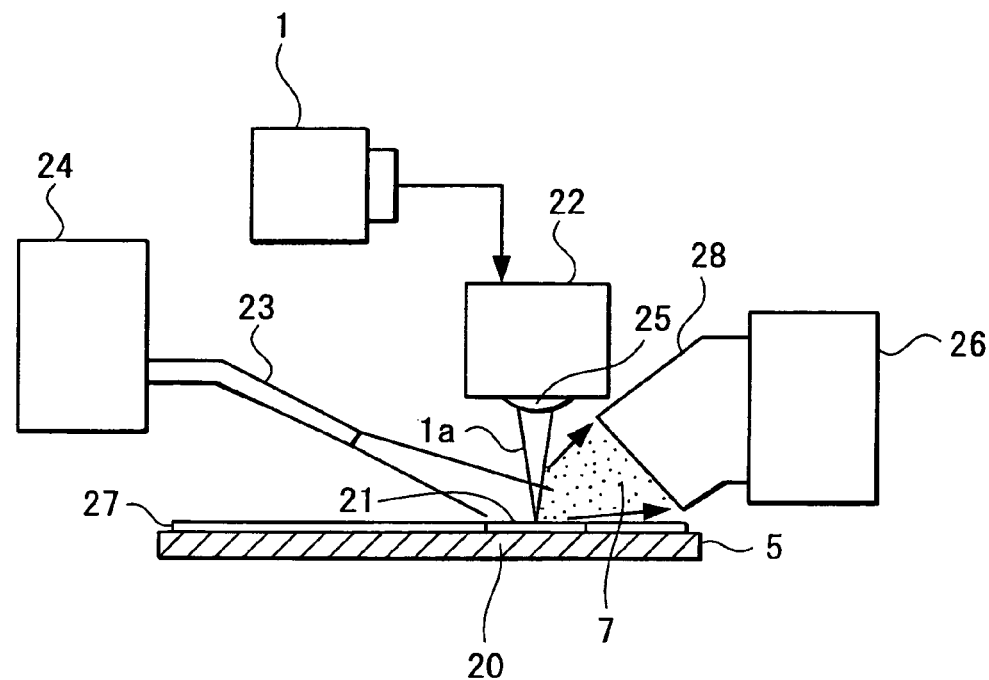
FIG. 1 is an schematic constitutional diagram showing an example of a laser processing apparatus of related art.

Next, FIGS. 5A, 5B and 5C show a method of processing the edge of an etching pattern of a processing object into a desired shape in the case where the irradiation of laser beams 3a and 3b are performed from the lower and upper directions of the substrate 5. As shown in FIG. 5A, when the wavelength of, for example, the ultraviolet ray is used and light is absorbed into the color layer absorbing color of the wavelength of the laser light 1a, with which the transparent resin layer 8 formed on the substrate 5 is irradiated, a resin layer 11b made of a black thin film is added. The resin layer 11b of this thin film may be a black resin layer, but it is also possible to color the layer simply with an organic material, such as a paint, using a felt pen. As shown in FIG. 5C, which is a magnified view of a portion A in FIG. 5A, this resin layer 11b is irradiated with the laser light 1a such that the upper-side laser beam 3b and lower-side laser beam 3a are exactly focused on points F1 and F2 on the front and back surfaces of the resin layer 11b, respectively, with focal depths of the objective lens 25 and the reduction projection lens 4 in FIG. 1 being adjusted. By doing so, as shown in FIG. 5B, an edge of the etching pattern can be processed into the edge having an approximately vertical shape 12.

On the other hand, when a focal point F3 of the laser beam 3a from the lower side is shifted upward as shown in FIG. 6A, the edge of an etching pattern becomes an inverted tapered-shape 13 having an inverted cone shape as shown in FIG. 6B. Further, when a focal point F4 of the laser beam 3b from the upper side is shifted downward as shown in FIG. 7A, the edge of an etching pattern becomes a tapered-shape 14 having a cone shape as shown in FIG. 7B. It is conceivable that these phenomena occur due to the fact that beam profiles greatly affect the processing when the absorption of energy increases by the color of the resin layer 11a that is black. Although the above-described embodiment is explained with respect to the transparent resin layer in the production of a liquid crystal panel, it should be appreciated that the transparent resin layer is not limited to that of resin materials but may also be a transparent conductive film and the like, such as ITO.

According to the embodiments of the laser processing apparatus, the laser processing method, the debris extraction mechanism and the debris extraction method, the following can be obtained:

(A) Debris can be isotropically generated upward by irradiating a transparent resin layer efficiently absorbing laser with laser light from the lower side;

(B) Debris can be isotropically generated upward by adding a resin layer easily absorbing laser light, such as a black resin layer, to a transparent resin layer not easily absorbing laser light;

(C) With the above-described (A) and (B), the debris extracting rate can be greatly improved by providing a debris extraction mechanism on the upper side;

(D) A desired shape of the pattern edge can be obtained by adding the black resin layer to the substrate; and (E) With the above-described (C) and (D), patterning is directly performed using the laser, and such direct patterning can replace the patterning performed in the photolithography process in the past.

It should be understood by those skilled in the art that various modifications, combinations, sub-combinations and alterations may occur depending on design requirements and other factors insofar as they are within the scope of the appended claims or the equivalents thereof.

What is claimed is:

1. A laser processing method comprising the steps of:
   irradiating a transparent resin layer with laser light that passes through a transparent substrate, the transparent resin layer being formed on a first side of the transparent substrate; and
   extracting debris generated by irradiating the transparent resin layer with a debris extraction module provided on the first side of the transparent substrate.

2. The laser processing method according to claim 1, further comprising the step of:
   forming a thin film on the transparent resin layer, the thin film absorbing color of a wavelength of the laser light.

3. The laser processing method according to claim 2, further comprising the step of:
   defocusing the laser light on the thin film.

4. The laser processing method according to claim 3, further comprising the step of:
   forming a pattern edge in the thin film, the pattern edge having a cross sectional shape of a section of an inverted cone.

5. The laser processing method according to claim 4, wherein the pattern edge formed in the thin film has a cross sectional shape of a section of an inverted cone pointing toward the transparent substrate.

6. The laser processing method according to claim 4, wherein the pattern edge formed in the thin film has a cross sectional shape of a section of an inverted cone pointing away from the transparent substrate.

7. The laser processing method according to claim 1, wherein the transparent resin layer is formed directly on the transparent substrate.

8. The laser processing method according to claim 2, wherein the thin film is a black resin layer.

9. The laser processing method according to claim 2, wherein the transparent resin is formed of a first resin material.

10. The laser processing method according to claim 9, wherein the thin film is formed of a second resin material.

11. The laser processing method according to claim 1, further comprising the step of:
    forming a thin film between the transparent resin layer and the transparent substrate, the thin film absorbing color of a wavelength of the laser light.

12. The laser processing method according to claim 11, wherein the thin film is formed directly on the transparent substrate.

13. The laser processing method according to claim 11, wherein the transparent resin layer is formed directly on the thin film.

14. The laser processing method according to claim 3, wherein the thin film is a black resin layer.

15. The laser processing method according to claim 11, wherein the transparent resin is formed of a first resin material.

16. The laser processing method according to claim 15, wherein the thin film is formed of a second resin material.

17. A debris extraction method comprising the steps of:
    irradiating a transparent resin layer with laser light that passes through a transparent substrate, the transparent resin layer being formed on a first side of the transparent substrate; and
    extracting debris generated by irradiating the transparent resin layer with a debris extraction module provided on the first side of the transparent substrate.

* * * * *